United States Patent
Luo et al.

(10) Patent No.: US 10,328,486 B2
(45) Date of Patent: Jun. 25, 2019

(54) AUTOMATICALLY-RETURNING MOLD EJECTION DEVICE AND CASTING MOLD COMPRISING THE SAME

(71) Applicant: CITIC Dicastal CO., LTD, Qinhuangdao (CN)

(72) Inventors: Fengbao Luo, Qinhuangdao (CN); Yongning Wang, Qinhuangdao (CN); Zhihua Zhu, Qinhuangdao (CN); Changhai Li, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 316 days.

(21) Appl. No.: 15/491,002

(22) Filed: Apr. 19, 2017

(65) Prior Publication Data
US 2017/0297090 A1    Oct. 19, 2017

(30) Foreign Application Priority Data
Apr. 19, 2016    (CN) .......................... 2016 1 0243089

(51) Int. Cl.
| B22D 17/22 | (2006.01) |
| B29C 45/40 | (2006.01) |
| B22C 9/22 | (2006.01) |
| B62D 7/18 | (2006.01) |
| B22D 25/00 | (2006.01) |

(52) U.S. Cl.
CPC ............ *B22C 9/22* (2013.01); *B22D 17/2236* (2013.01); *B62D 7/18* (2013.01); *B22D 25/00* (2013.01); *B29C 45/40* (2013.01)

(58) Field of Classification Search
CPC ........................... B22D 17/2236; B29C 45/40
See application file for complete search history.

(56) References Cited

U.S. PATENT DOCUMENTS 5,472,335 A * 12/1995 Morikita ................. B29C 45/38
264/334

FOREIGN PATENT DOCUMENTS

JP    01314127 A  * 12/1989
JP    05154847 A  *  6/1993

* cited by examiner

*Primary Examiner* — Kevin E Yoon
(74) *Attorney, Agent, or Firm* — Maier & Maier, PLLC

(57) ABSTRACT

An automatically-returning mold ejection device and a casting mold comprising the same. The mold ejection device includes a lower-portion part and an upper-portion part and is wherein the lower-portion part comprises returning rod ejection columns fixed to a mold rack base plate; the upper-portion part comprises returning rods corresponding to the returning rod ejection columns, the top ends of the returning rods are fixed to an ejection rod pushing plate and penetrate through an upper mold connecting plate through returning rod flanges, and a lower mold core of a mold is fixed to the mold rack base plate through a screw. An embodiment of the device has the advantages that the self-returning structure is simple, easy to install and convenient to replace and maintain, and has very good practicability.

10 Claims, 6 Drawing Sheets

AUTOMATICALLY-RETURNING MOLD EJECTION DEVICE AND CASTING MOLD COMPRISING THE SAME

TECHNICAL FIELD

The invention relates to the field of automobile parts, in particular to an automatically-returning mold ejection device and a casting mold comprising the same.

BACKGROUND ART

Automobile steering knuckles play a very important role in automotive chassis. At present, more and more automobile steering knuckles are made of an aluminum alloy material, and in production and manufacture of the automobile steering knuckles, the automobile steering knuckles produced by adopting a differential-pressure casting process are increasingly favored by all automobile manufacturers and producers throughout the world with few internal defects, high mechanical properties and good appearance. Thus, the mold design of aluminum alloy differential-pressure steering knuckles seems very important. Most of automobile differential-pressure steering knuckle molds are produced and manufactured overseas. In recent years, domestic mold designing manufacturers also start to perform design and manufacture gradually.

At present, in the using process of existing differential-pressure molds, ejection rods cannot automatically reset after ejecting out castings, and the ejection rods are ejected back through mechanical return column devices after upper and lower molds are close to each other to complete mold closing. For common steering knuckles for which lateral pull core structures are not needed to be designed, the return devices have no problem. However, for the steering knuckles for which the lateral pull core structures are needed to be designed, severe problems often arise. The specific situation is that the ejection rods stay at ultimate positions after ejecting out from castings. When a next casting cycle begins, the ejection rods do not reset when mold closing of the upper mold begins and during mold closing; while the lateral pull core structures simultaneously move towards the inner sides of a mold core at the moment, if a certain ejection rod is rightly located at the upper portion of the pulled core, the ejection rod which does not return bumps against the pull core moving towards the inner side to cause mold damage, or even the differential-pressure design is damaged. In addition, due to the fact that a drop exists in automobile steering knuckle molding in the height direction, the lengths of the ejection rods are certainly different. When the long ejection rods and short ejection rods eject out the casting, the long ejection rods produce large deformations, the short ejection rods produce small deformations, and accordingly asynchronous release of the steering knuckle casting from upper mold core and casting surface scratching are caused. Due to the fact that the automobile steering knuckles are bearing parts, the bearing parts bear very large alternating stress loads and deformations in the high-speed running process of an automobile, and small scratches on the casting surface possibly cause casting cracks or even breakage. Therefore, if a device with an ejection mechanism making ejection rods resettable can be designed based on an original structure, the above problems arisen in actual production will be well solved.

SUMMARY OF THE INVENTION

For overcoming the shortcomings in the prior art, the present invention aims at designing a device capable of making ejection rods return automatically after the ejection rods eject out a casting based on an existing mold structure.

On one aspect of the present invention, an automatically-returning mold ejection device is disclosed. The mold ejection device consists of a lower-portion part and an upper-portion part and is characterized in that the lower-portion part comprises returning rod ejection columns (3) fixed to a mold rack base plate (1); the upper-portion part comprises returning rods (5) corresponding to the returning rod ejection columns (3), and the top ends of the returning rods (5) are fixed to an ejection rod pushing plate (10) and penetrate through an upper mold connecting plate (18) through returning rod flanges (11); a lower mold core (19) of a mold is fixed to the mold rack base plate (1) through a screw, and the mold rack base plate (1) is fixed to a mold casting machine table; the upper-portion part of the device consists of hoisting screws (6), upper mold core water distributors (7), second screws (8), ejection rod pressing plate limiting columns (9), the ejection rod pushing plate (10), the returning rod flanges (11), reset springs (12), returning rod connecting plates (13), third screws (14), ejection rod pressing plate limiting blocks (15), returning rod guide sleeves (16), fourth screws (17) and the upper mold connecting plate (18); the upper portions of the returning rods (5) penetrate through the returning rod guide sleeves (16) and the returning rod flanges (11), and the tops of the returning rods (5) are fixedly connected to the ejection rod pushing plate (10) through the returning rod connecting plates (13); the returning rod flanges (11) fix the returning rods (5) in flange circular grooves formed in the upper mold connecting plate (18) through the third screws (14); the upper-middle positions of the returning rods (5) are sleeved with the reset springs (12), the reset springs (12) are located at the circular hole positions of the flange centers of the returning rods (5) and are configured to make the lower ends of the reset springs (12) in contact with flange circular groove planes of the upper mold connecting plate (18) and the upper ends of the reset springs (12) in contact with lower planes of the returning rod connecting plates (13), so that the reset springs (12) are compressed and spring back only in the vertical direction, rather than lateral deviation or deflection; the ejection rod pressing plate limiting blocks (15) are fixed to the upper mold connecting plate (18) through bolts; the returning rod ejection columns (3) are configured to achieve that the closing of an upper mold core (20) and a lower mold core (19) is already completed and ejection rods (21) already return to original positions when the bottom end faces of the returning rods (5) are in contact with the upper end faces of the returning rod ejection columns (3).

On the preferred aspect of the present invention, the lower-portion part of the device consists of a mold rack base plate (1), lower mold core water distributors (2), returning rod ejection columns (3), first screws (4) and returning rods (5); the lower mold core water distributors (2) are locked and fixed to the mold rack base plate (1) through screws; the returning rod ejection columns (3) are locked and fixed to the mold rack base plate (1) through the first screws (4).

On the preferred aspect of the present invention, the lower mold core water distributors are locked and fixed to a lower mold plate through 4 to 6 screws, and the screws are evenly distributed along the circumference.

On the preferred aspect of the present invention, the first screws (4) are M12×95 inner hexagonal screws.

On the preferred aspect of the present invention, the returning rod flanges (11) are installed in the flange circular grooves formed in the upper portion of the upper mold connecting plate (18) through 4 third screws (14) evenly distributed along the circumference.

On the preferred aspect of the present invention, the device comprises four returning rods (5) distributed along the circumference and one returning rod (5) located at the center of a circle.

On the preferred aspect of the present invention, the second screws (8) are M16×110 inner hexagonal screws, the third screws (14) are M8×20 inner hexagonal screws, and the fourth screws (17) are M8×25 inner hexagonal screws.

The number of the ejection rod pressing plate limiting columns (9) is 5 to 6, the ejection rod pressing plate limiting columns (9) are locked on the ejection rod pushing plate (10) through the second screws (8).

The positions, corresponding to the returning rods (5), of the lower portion of the ejection rod pushing plate (10) are provided with key slots, the key slots are matched with flat keys at the tops of the returning rods (5) to play an anti-rotation role.

On the other aspect of the present invention, a casting mold of the automatically-returning mold ejection device described above is provided, the casting mold further comprises a lower mold core (19), an upper mold core (20), ejection rods (21), ejection rod pressing plates (22), wedges (23), lateral pull cores (24), transversely moving guide rails (25), transversely moving guide plates (26), long screws (27), wedge plates (28) and heightening members (29) and characterized in that the lower mold core (19) is fixed to the mold rack base plate (1) through screws, and the wedges (23) are locked and fixed to the side faces of the lower mold core (19) through screws and arranged on an upper plane of the mold rack base plate (1); the transversely moving guide plates (26) are fixed to the upper mold core (20) through screws, the lateral pull cores (24) are connected with the transversely moving guide rails (25) through screws, and they are configured to perform transverse reciprocating motions along guide grooves of the transversely moving guide plates (26); the lateral pull cores (24) are configured to perform upward and downward motions along oblique upper guide strips on the wedges (23) in the drawing process, and accordingly the lateral pull cores (24) are configured to achieve entering and drawing out; the wedge plates (28) are fixed to the wedges (23) through the long screws (27), the wedge plates (28) are machined and made by an abrasion-proof material, and the oblique planes of the wedge plates (28) are matched with planes of the rear sides of the lateral pull cores (24); the heightening members (29) are placed on the upper plane of the upper mold core (20) and locked through the screws, so that the upper end faces of the heightening members (29) and the lower plane of the upper mold connecting plate (18) are matched and are locked through the screws.

The present invention further adopts the following technical scheme: an aluminum alloy steering knuckle differential-pressure mold self-returning mechanism is structurally and mainly consists of the following parts: a lower mold plate, lower mold core water distributors, returning rod ejection columns, M12×95 inner hexagonal screws, returning rods, hoisting screws, upper mold core water distributors, M16×110 inner hexagonal screws, ejection rod pressing plate limiting columns, an ejection rod pushing plate, returning rod flanges, reset springs, returning rod connecting plates, M8×20 inner hexagonal screws, ejection rod limiting blocks, returning rod guide sleeves, M8×25 inner hexagonal screws, the upper mold connecting plate and the like. The specific installation mode is as follows: the lower mold core water distributors are locked and fixed to the lower mold plate through the screws, the number of the lower mold core water distributors is 6 or 4, the lower mold core water distributors are evenly distributed circumferentially and used for being in butt joint with a cooling pipeline on the lower mold core. The returning rod ejection columns are locked and fixed to the lower mold plate through the M12×95 inner hexagonal screws, the number of the returning rod ejection columns evenly distributed circumferentially is 4 generally, 1 returning rod ejection column is installed at the central position, and accordingly it can be ensured that the mechanism is stable and does not deflect in the returning process. The returning rods are located above the returning rod ejection columns, and it is indicated that the returning process is completed when the lower end faces of the returning rods are in contact with the upper faces of the returning rod ejection columns. The upper portions of the returning rods penetrate through the returning rod guide sleeves and the returning rod flanges, and the tops of the returning rods are fixedly connected to the ejection rod pushing plate through returning rod connecting plates. The returning rod flanges are fixed in the flange circular grooves of the upper mold connecting plate through 4 M8×20 inner hexagonal screws evenly distributed circumferentially. The upper-middle positions of the returning rods are sleeved with the reset springs, the reset springs are located at the circular hole positions of the flange centers of the returning rods, the lower ends of the reset springs are in contact with flange circular groove planes of the upper mold connecting plate, the upper ends of the reset springs are in contact with lower planes of the returning rod connecting plates, and accordingly it can be ensured that the reset springs are compressed and spring back only in the vertical direction and do not produce lateral deviation or deflection. The ejection rod limiting blocks are fixed to the upper mold connecting plate through bolts, the limiting effects of the ejection rod limiting blocks can make the ejection rod pushing plate move within an ejecting-out travel, no over-travel movement occurs, and an accurate and safe ejection distance is ensured.

In the actual working process, a mold casting machine drives the upper portion of a mold rack to lift after a casting period (including molten aluminum filling, solidification and cooling) of a casting is completed. At the moment, the ejection parts of the mold rack do not perform actions, a receiving tray moves to the position below the casing and prepares to receive the casting when the uppermost limit position is reached through drawing, an ejecting hydraulic cylinder of the mold casting machine begins to move downwards and to be in contact with the upper end faces of ejection rod pressing plate limiting columns and continues to move downwards, the ejection rod pressing plate limiting columns are connected with the ejection rod pushing plate through screws, and circular caps at the upper ends of the ejection rods are embedded into ejection rod pushing plate cap holes. Due to the effect of a hydraulic pressure, both the ejection rod pushing plate and the returning rods move downwards. At the same time, the ejection rod pressing plates also move downwards together with the ejection rods, the ejection rods penetrate through the upper mold core, and the ends of the ejection rods are in contact with the surfaces of the casting ejection rod positions. The casting is subjected to the downward pressure effect, and after the downward pressure is greater than an upper mold grabbing force of the casting, the casting is released from the upper mold core. After the casting is ejected and released out of the upper mold core, the casting falls onto the receiving tray, the receiving tray is moved out of the mold casting machine.

The ejecting hydraulic cylinder of the mold casting machine returns and exerts the downward pressure no longer, at the moment, the upper portion of the mold rack makes the returning rods and the ejection rod pressing plate perform upward motions together due to the springback effect of the reset springs. Therefore, an automatic reset state of the ejection rods is achieved. When a next casting cycle begins and the upper portion of the mold rack begins to perform downward motion for mold closing, the lateral pull cores are driven to perform downward motions and to be gradually in contact with the upper ends of the wedges, and then the lateral pull cores perform downward motions along oblique lower guide blocks on the wedges. Meanwhile, the lateral pull cores perform rightward motions under the effects of the transversely moving guide rails. Under the compound motions, the lateral pull cores gradually move towards a mold cavity in the mold closing process. Finally, when the mold closing is completed, the lateral pull cores also move to the predetermined positions of the mold cavity so as to complete mold closing. In the mold closing process, due to the reset effects of the springs on the mold rack, the ejection rods automatically move upwards and return to the original positions after the casting is de-molded. Therefore, the ejection rods are located at the original positions in the whole mold closing process. In this way, the phenomenon that the ejection rods bump against the lateral pull cores due to the fact that the ejection rods do not return and accordingly breakage of the ejection rods or even mold damage and other severe problems are caused is avoided in the inward moving process of the lateral pull cores.

The device of the present invention has the following advantages that when the upper mold of the mold does not execute a mold closing action, the ejection rods already automatically return to the original positions; for the steering knuckle mold with lateral pull core structures, the pull core structures move towards the mold cavity and is not affected by the ejection rods, certainly, the problem that the pull cores bump against the ejection rods does not arise. In addition, such self-returning structure can make the ejection rods to keep a uniform and stable stress in the casting ejecting-out process, it is ensured that all the ejection rods synchronously eject out the casting to the most degree, the unbalance loading influence caused by the height difference of steering knuckle molding is avoided, and the surface scratching problem caused during casting de-molding can be effectively prevented. This self-returning structure is simple, easy to install and convenient to replace and maintain and has very good practicability.

The technical scheme of the patent of the invention also has the following industrial significance: the automobile aluminum alloy differential-pressure steering knuckle casting mold adopts the design of the ejection self-returning type spring reset structure. In the existing domestic automobile aluminum alloy steering knuckle differential-pressure casting molds, the devices capable of making the ejection mechanisms return automatically do not exist. Although automatic ejection mechanism reset devices already exist in other products (for example injection molding products) and processes, the field of the differential-pressure casting molds is still blank.

On the second aspect of the industrial significance of the present invention, a matching method of the lateral pull core structures and the ejection mechanism of the mold in motion during mold opening and closing is provided. A movable cross beam of a differential-pressure casting press machine performs upward motion and drives the upper portion of the mold rack and the upper mold core 20 to perform upward motions so as to achieve mold opening, and the ejecting hydraulic cylinder of the differential-pressure mold casting machine performs downward motion and drives the ejection mechanism to perform downward motion after mold opening, so that the ejection rods 21 downwards eject the casting to make the casting de-molded and fall onto the receiving tray. After the casting is de-molded, the reset springs 12 in the mold rack automatically spring back and drive the ejection mechanism to return. In the mold closing process, the lateral pull cores 24 simultaneously follow and move towards the inner side of the mold cavity. Due to the fact that the ejection rods 21 already return, the phenomenon that the lateral pull cores 24 bump against the ejection rods 21 to cause mold damage does not occur absolutely. Due to the fact that the bump problem only occurs in the mold design of the automobile differential-pressure aluminum alloy steering knuckle, the structures of the lateral pull cores 24 must be adopted. In addition, the problem only occurs when the ejection rods 21 are arranged above the lateral pull cores 24, so that the problem is very easily neglected by a designer in the mold designing process, and meanwhile the problem is also difficult to find in the mold maintaining process due to the static disassembling and assembling process. However, once the problem arises in the mold trial-manufacturing process, inestimable damage will be caused to the mold or even the whole differential-pressure mold casting machine.

The present invention is a structural optimized design or improvement of the ejection part of an existing mold based on the existing differential-pressure automobile steering knuckle casting mold, so that the differential-pressure steering knuckle casting mold is more reasonable in structure, a high-quality and high-performance qualified differential-pressure aluminum alloy steering knuckle product can be more effectively provided, further the working efficiency of the differential-pressure device is improved, and the service life of the differential-pressure steering knuckle mold is prolonged.

BRIEF DESCRIPTION OF THE DRAWINGS

The implementation scheme of the present invention is described below in detail in combination with attached drawings, wherein.

Figure 1:
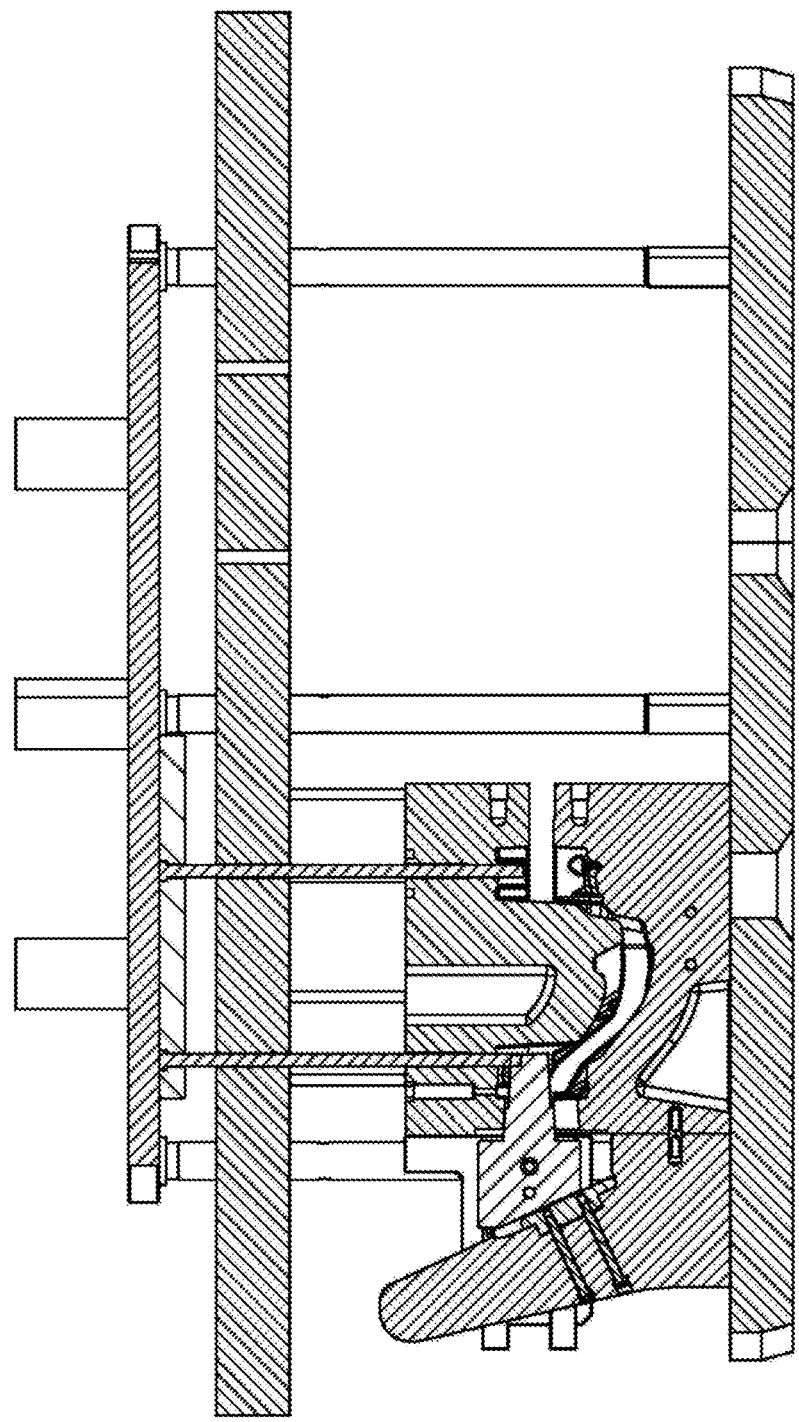
FIG. 1 is a bump interference state diagram when mold closing of the mold rack is not completed and the pull cores and the ejection rods do not return.
Figure 2:
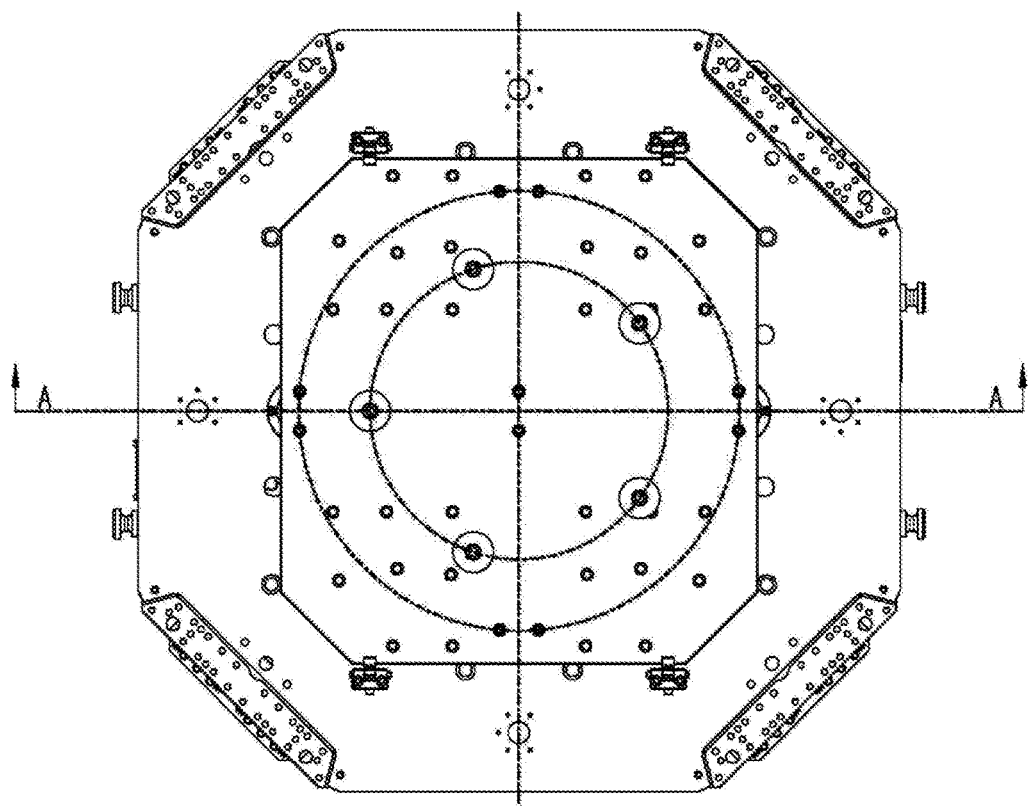
FIG. 2 is a top view of the mold rack of a differential-pressure steering knuckle.
Figure 3:
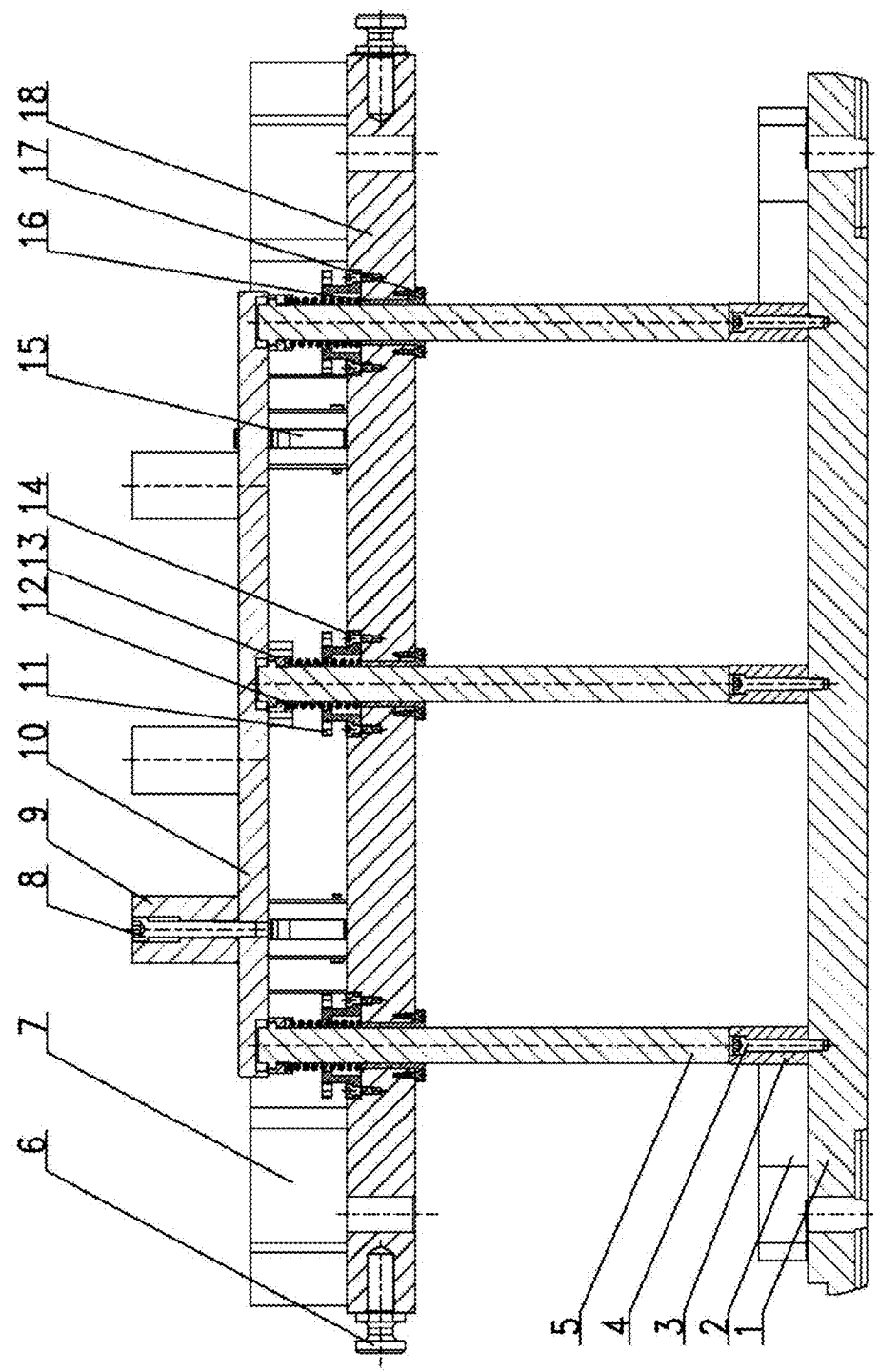
FIG. 3 is a state diagram after the mold closing of the mold rack is completed and the ejection rods return automatically.
Figure 4:
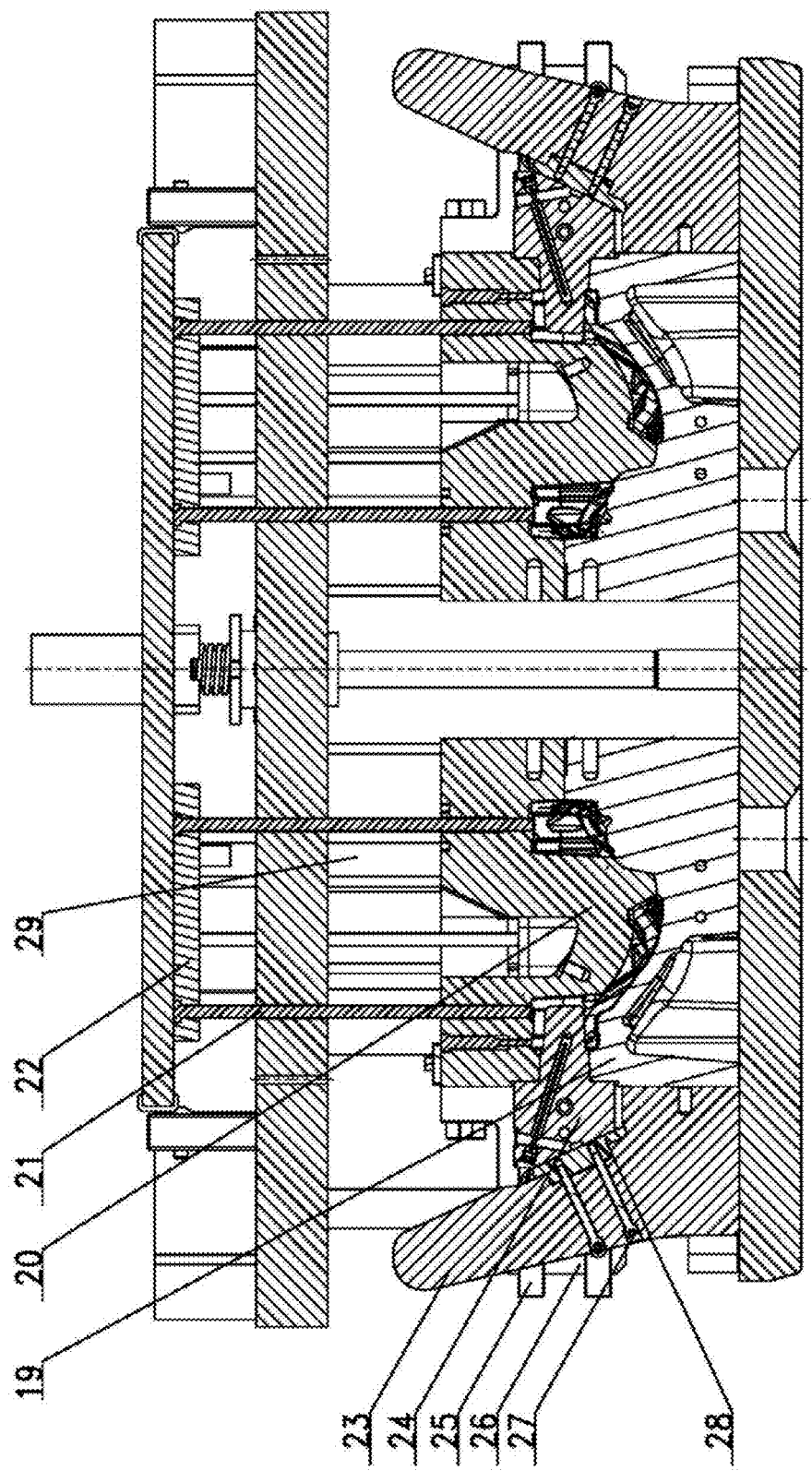
FIG. 4 is a state diagram after the mold rack drives the pull cores to perform the mold closing and the ejection rods return automatically.
Figure 5:
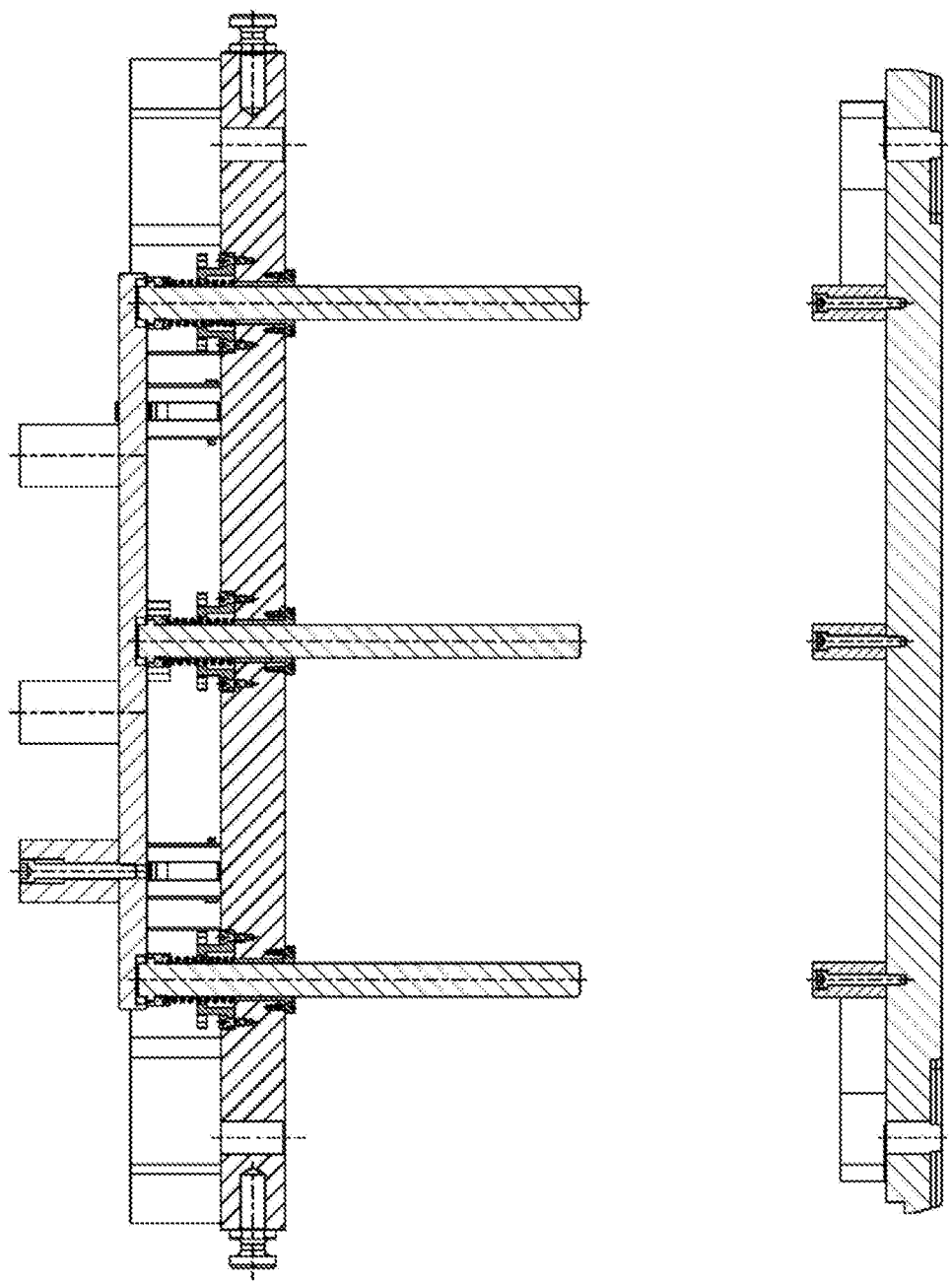
FIG. 5 is a state diagram after the mold rack of the differential-pressure steering knuckle is ejected out and then begins to perform mold closing but when the ejection rods do not return.
Figure 6:
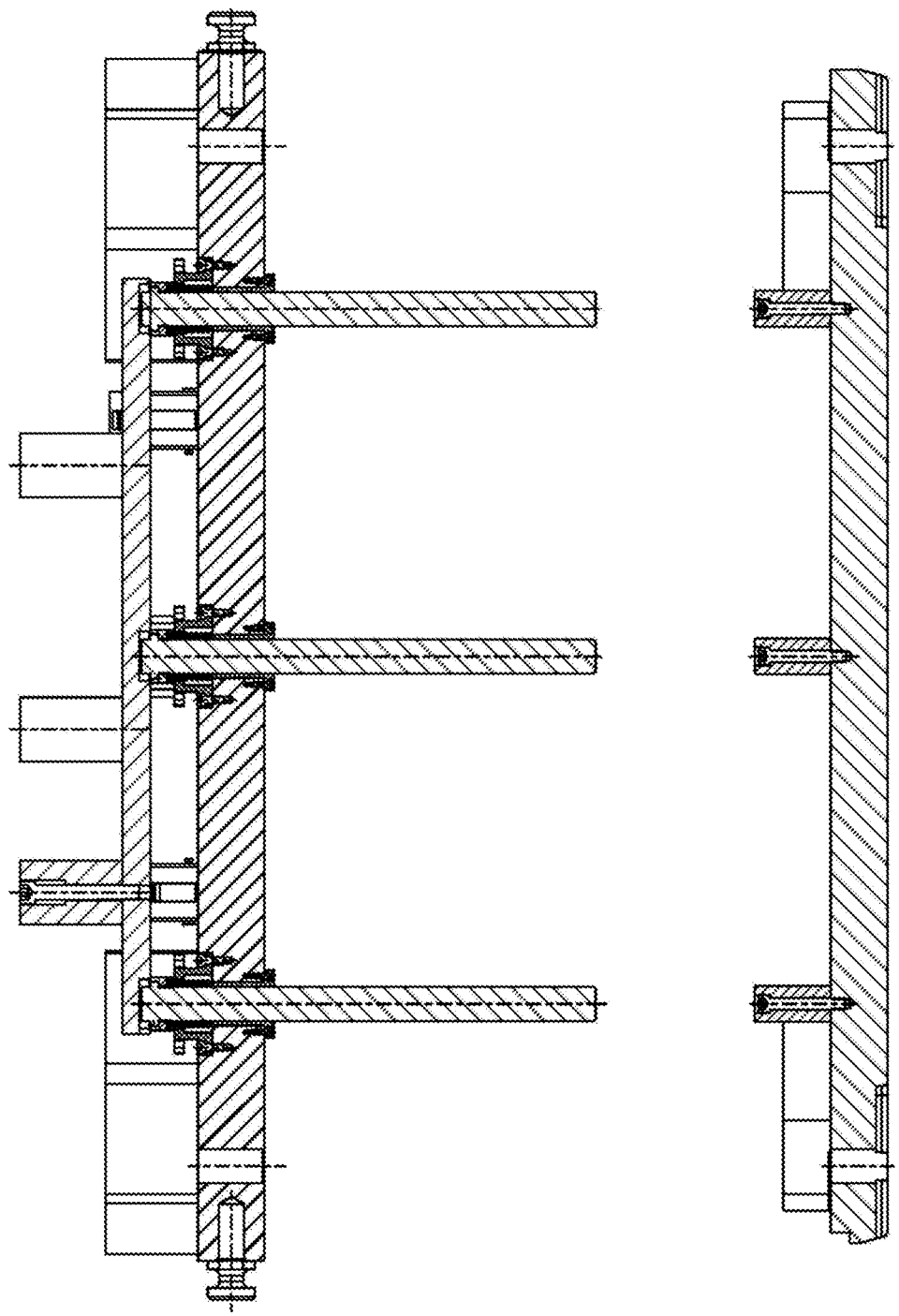
FIG. 6 is a state diagram after the mold rack of the differential-pressure steering knuckle performs mold lifting but when the ejection rods do not return.

In Figures: 1—mold rack base plate, 2—lower mold core water distributors, 3—returning rod ejection columns, 4—M12×95 inner hexagonal screws, 5—returning rods, 6—hexagonal screws, 7—upper mold core water distributors, 8—M16×110 inner hexagonal screws, 9—ejection rod pressing plate limiting columns, 10—ejection rod pushing plate, 11—returning rod flanges, 12—reset springs, 13—returning rod connecting plates, 14—M8×20 inner hexagonal screws, 15—ejection rod limiting blocks, 16—returning rod guide sleeves, 17—M8×25 inner hexagonal screws, 18—upper mold connecting plate, 19—lower mold core, 20—upper mold core, 21—ejection rods, 22—ejection rod pressing plates, 23—wedges, 24—lateral pull cores, 25—transversely moving guide rails, 26—transversely moving guide plates, 27—long screws, 28—wedge plates and 29—heightening members.

DETAILED DESCRIPTION OF THE INVENTION

The detailed description and operating situations of the specific device provided according to the present invention are given below in conjunction with the attached drawings. In the embodiment, the terms 'first screws' and 'M12×95 inner hexagonal screws' can be used interchangeably; the terms 'second screws' and 'M16×110 inner hexagonal screws' can be used interchangeably; the terms 'third screws' and 'M8×20 inner hexagonal screws' can be used interchangeably; the terms 'fourth screws' and 'M8×25 inner hexagonal screws' can be used interchangeably.

The device consists of a mold rack base plate 1, lower mold core water distributors 2, returning rod ejection columns 3, first screws 4 (M12×95 inner hexagonal screws), returning rods 5, hoisting screws 6, upper mold core water distributors 7, second screws 8 (M16×110 inner hexagonal screws), ejection rod pressing plate limiting columns 9, an ejection rod pushing plate 10, returning rod flanges 11, reset springs 12, returning rod connecting plates 13, third screws 14 (M8×20 inner hexagonal screws), ejection rod limiting blocks 15, returning rod guide sleeves 16, M8×25 inner hexagonal screws 17, an upper mold connecting plate 18 and other parts, and the device and a lower mold core 19, an upper mold core 20, ejection rods 21, ejection rod pressing plates 22, wedges 23, lateral pull cores 24, transversely moving guide rails 25, transversely moving guide plates 26, long screws 27, wedge plates 28, heightening members 29 and other mold core parts and lateral pull core structure parts form a complete set of automobile differential-pressure steering knuckle casting mold.

4 or 6 lower mold core water distributors 2 are installed on the edge of the mold rack base plate 1, evenly distributed circumferentially and used for being connected with a lower cooling pipeline on the mold casting machine, and cooling water flows into the lower mold core 19 along the pipeline through the lower mold core water distributors 2 for cooling. 4 returning rod ejection columns 3 are evenly arranged with the mold rack base plate 1 as the center, and one returning rod ejection column is installed at the central position of the mold rack base plate 1. Therefore, the returning rod ejection columns 3 form 5-columns plum blossom shaped layout, and the returning rod ejection columns 3 are locked on the mold rack base plate 1 through the M12×95 inner hexagonal screws. The parts are all fixed to the mold casting machine table and are immobilized.

The effect of the returning rod ejection columns 3 is that the closing of the upper mold core 20 and the lower mold core 19 is already completed and the ejection rods 21 already return to original positions when the bottom end faces of the returning rods 5 are in contact with the upper end faces of the returning rod ejection columns 3. If the motion positions of the parts are normal, a next casting work cycle can start on. The number of the evenly arranged ejection rod pressing plate limiting columns 9 is generally 5 or 6 according to the spatial position demands, and the ejection rod pressing plate limiting columns 9 are locked on the ejection rod pushing plate 10 through the M16×110 inner hexagonal screws 8. The ejection rod pressing plate limiting columns 9 receive the hydraulic pressure exerted by the ejecting hydraulic cylinder on the differential-pressure mold casting machine and then press down the ejection rod pushing plate 10 to perform downward motions together. Generally, 4 ejection rod pressing plate limiting blocks 15 are evenly distributed on the edge of the ejection rod pushing plate 10 and limit the downward movement and return travel of the ejection rod pushing plate.

Generally, the returning rods 5 are circumferentially and evenly distributed under the ejection rod pushing plate 10 in the mode of 5-rod plum blossom form layout. Key slots are formed in the corresponding positions of the lower portion of the ejection rod pushing plate 10 and are rightly matched with flat keys at the tops of the returning rods 5 to play an anti-rotation role. The top ends of the returning rods 5 are embedded into the returning rod connecting plates 13, the returning rod connecting plates 13 are locked under the ejection rod pushing plate 10 through the inner hexagonal screws. At the moment, the returning rods 5, the ejection rod pushing plate 10 and the ejection rod pressing plate limiting columns 9 are connected to form a whole and can perform downward motions together.

The hoisting screws 6 are installed on the side face of the upper mold connecting plate 18 and are installed oppositely, two screws are installed on each side, and the hoisting screws are used for facilitating hoisting transportation in the mold assembly process. The upper mold core water distributors 7 correspond to the lower mold core water distributors 2 in installing position in the vertical direction and are installed at the upper portion of the upper mold connecting plate 18, and the number of the upper mold core water distributors 7 is 4 or 6. The upper mold core water distributors 7 are used for being connected with an upper cooling water pipeline on the differential-pressure mold casting machine, and cooling water flows into the upper mold core 20 through the upper mold core water distributors 7 along the pipeline for cooling. Meanwhile, the upper mold core water distributors are also connected with the movable cross beam of the differential-pressure mold casting machine through screws and are further connected with the upper mold connecting plate 18 through screws. Therefore, the movable cross beam of the differential-pressure mold casting machine can drive the upper mold connecting plate 18 to perform vertical motion through the upper mold core water distributors 7 and further achieve mold opening and closing actions.

The returning rod flanges 11 are circumferentially and evenly distributed and installed in flange circular grooves formed in the upper portion of the upper mold connecting plate 18 through the M8×20 inner hexagonal screws 14.

The upper-portion circular planes of the returning rod flanges 11 are regarded as the lowest limiting movement plane of the ejection rod pushing plate 10 and can be named as limiting planes. When the ejection rod pushing plate downwards moves to be in contact with the upper-portion circular planes of the returning rod flanges 11, the ejection rod pushing plate stops moving and do not continue to perform pressing-down motion.

At the same time, the reset springs 12 are placed in the internal circular holes of the returning rod flanges, the upper ends of the reset springs 12 abut against the lower-end planes of the returning rod connecting plates 13, and the lower ends of the reset springs 12 are located on the planes in the flange circular grooves of the upper portions of the upper mold connecting plate 18. Therefore, it can be ensured that the reset springs 12 can be compressed and spring back only at the vertical positions and do not produce deviation or deflection. The operating stability of the mold rack mechanism can be ensured.

The returning rod guide sleeves 16 penetrate through the lower portion of the upper mold connecting plate 18 and are located on the lower plane of the upper mold connecting plate 18 through the M8×25 inner hexagonal screws. The inner surfaces of the returning rod guide sleeves 16 are provided with lubricating oil grooves containing lubricating oil, it is can be ensured that abrasion is small when the returning rods 5 performs motions in the returning rod guide sleeves 16, and the service life of the returning rods 5 is prolonged.

The lower mold core 19 is fixed to the mold rack base plate 1 through a screw, the wedges 23 are locked and fixed to the side face of the lower mold core 19 through screws and are arranged on the upper plane of the mold rack base plate 1. The transversely moving guide plates 26 are fixed to the upper mold core 20 through screws, the lateral pull cores 24 are connected with the transversely moving guide rails 25 through screws, and the transversely moving guide plates 26 and the lateral pull cores 24 perform transverse reciprocating motions along guide grooves of the transversely moving guide plates 26. Meanwhile, they can also perform upward and downward motions along oblique upper guide strips on the wedges in the drawing process, and accordingly the lateral pull cores 24 can achieve entering and drawing out in the mold opening and closing process of the mold rack.

The wedge plates 28 are fixed to the wedges 23 through the long screws 27, the wedge plates are machined and made by an abrasion-proof material, and the oblique planes of the wedge plates 28 are matched with planes of the rear sides of the lateral pull cores 24, so that the abrasion of the lateral pull cores 24 and the wedges 23 is reduced in the motion process.

The heightening members 29 are placed on the upper plane of the upper mold core 20 and locked through the screws, and the upper end faces of the heightening members 29 and the lower plane of the upper mold connecting plate 18 are matched and are locked through the screws. In the drawing process, the whole upper portion of the mold rack comprising the returning rods 5, the hoisting screws 6, the upper mold core water distributors 7, the ejection rod pressing plate limiting columns 9, the ejection rod pushing plate 10, the returning rod flanges 11, the reset springs 12, the returning rod connecting plates 13, the ejection rod limiting blocks 15, the returning rod guide sleeves 16, the upper mold connecting plate 18 and other parts and the upper mold core 20, the ejection rods 21, the ejection rod pressing plates 22, the lateral pull cores 24, the transversely moving guide rails 25, the transversely moving guide plates 26, the long screws 27, the wedge plates 28, the heightening members 29 and the like are lifted to achieve drawing motion.

After the drawing is completed, the ejecting hydraulic cylinder of the differential-pressure mold casting machine performs downward motion, is gradually in contact with the upper end faces of ejection rod pressing plate limiting columns 9 and continues to move downwards, the ejection rod pressing plate limiting columns 9 are connected with the ejection rod pushing plate 10 through screws, and circular caps at the upper ends of the ejection rods are embedded into ejection rod pushing plate 10 cap holes. Due to the effect of the hydraulic pressure, both the ejection rod pushing plate 10 and the returning rods 5 move downwards. At the same time, the ejection rod pressing plates 22 also move downwards together with the ejection rods 21, the ejection rods 21 penetrate through the upper mold core 20, and the ends of the ejection rods 21 are in contact with the surfaces of the casting ejection rod positions. The casting is subjected to the downward pressure effect, and after the downward pressure is greater than an upper mold grabbing force of the casting, the casting is released from the upper mold core 20. After the casting is ejected and released out of the upper mold core 20, the casting falls onto the receiving tray, the receiving tray is moved out of the mold casting machine. The ejecting hydraulic cylinder of the mold casting machine returns and exerts the downward pressure no longer, at the moment, the upper portion of the mold rack makes the returning rods 5 and the ejection rod pressing plate 22 perform upward motions together due to the springback effect of the reset springs 12. Therefore, the automatic reset state of the ejection rods 21 is achieved. When the next casting cycle begins and the upper portion of the mold rack begins to perform downward motion for mold closing, the lateral pull cores 24 are driven to perform downward motions and to be gradually in contact with the upper ends of the wedges 23, and then the lateral pull cores 24 perform downward motions along oblique lower guide blocks on the wedges 23. Meanwhile, the lateral pull cores 24 perform rightward motions under the effects of the transversely moving guide rails 25. Under the compound motions, the lateral pull cores 24 gradually move towards a mold cavity in the mold closing process. Finally, when the mold closing is completed, the lateral pull cores 24 also move to the predetermined positions of the mold cavity so as to complete mold closing.

In the mold closing process, due to the reset effects of the springs 12 on the mold rack, the ejection rods 21 automatically move upwards and return to the original positions after the casting is de-molded. Therefore, the ejection rods 21 are located at the original positions in the whole mold closing process. In this way, the phenomenon that the ejection rods 21 bump against the lateral pull cores 24 due to the fact that the ejection rods 21 do not return and accordingly breakage of the ejection rods 21 or even mold damage and other severe problems are caused is avoided in the inward moving process of the lateral pull cores 24. In the meanwhile, due to the elastic force effect of the reset springs 12, the reset springs 12 have a counter-acting force to the ejection rod pushing plate 10 in the pressing-down process of the ejection rod pushing plate 10. Thus, it can be ensured that the whole ejection mechanism performs motion in a stable state in the downward ejecting process, vibration and unbalance loading produced when the ejection rods 21 are ejected out can be effectively avoided, further the surface scratching of the casting can be effectively avoided during de-molding, it is very advantageous to a follow-up heat treatment process and machining process of the casting, and meanwhile the mechanic and mechanical properties of the casting can be ensured.

The invention claimed is:

1. An automatically-returning mold ejection device, comprising:
   a lower-portion part and an upper-portion part, and the lower-portion part of the device further comprises returning rod ejection columns fixed to a mold rack base plate; the upper-portion part further comprises returning rods corresponding to the returning rod ejection columns, and the top ends of the returning rods are fixed to an ejection rod pushing plate and penetrate through an upper mold connecting plate through returning rod flanges; a lower mold core of a mold is fixed to the mold rack base plate through a screw, and the mold rack base plate is fixed to a mold casting machine table; the upper-portion part of the device includes hoisting screws, upper mold core water distributors, second screws, ejection rod pressing plate limiting columns, the ejection rod pushing plate, the returning rod flanges, reset springs, returning rod connecting plates, third screws, ejection rod pressing plate limiting blocks, returning rod guide sleeves, fourth screws and the upper mold connecting plate; the upper portions of the returning rods penetrate through the returning rod guide sleeves and the returning rod flanges, and the tops of the returning rods are fixedly connected to the ejection rod pushing plate through the returning rod connecting plates; the returning rod flanges fix the returning rods in flange circular grooves formed in the upper mold connecting plate through the third screws; the upper-middle positions of the returning rods are sleeved with the reset springs, the reset springs are located at the circular hole positions of the flange centers of the returning rods and are configured to make the lower ends of the reset springs in contact with flange circular groove planes of the upper mold connecting plate and the upper ends of the reset springs in contact with lower planes of the returning rod connecting plates, so that the reset springs are compressed and spring back only in the vertical direction, rather than lateral deviation or deflection; the ejection rod pressing plate limiting blocks are fixed to the upper mold connecting plate through bolts; and the returning rod ejection columns are configured to achieve that the closing of an upper mold core and a lower mold core is already completed and ejection rods already return to original positions when the bottom end faces of the returning rods are in contact with the upper end faces of the returning rod ejection columns.

2. The automatically-returning mold ejection device according to claim 1, wherein the lower-portion part of the device consists of a mold rack base plate, lower mold core water distributors, returning rod ejection columns, first screws and returning rods; the lower mold core water distributors are locked and fixed to the mold rack base plate through screws; and the returning rod ejection columns are locked and fixed to the mold rack base plate through the first screws.

3. The automatically-returning mold ejection device according to claim 2, wherein the lower mold core water distributors are locked and fixed to a lower mold plate through 4 to 6 screws, and the screws are evenly distributed along the circumference.

4. The automatically-returning mold ejection device according to claim 2, wherein the first screws are M12×95 inner hexagonal screws.

5. The automatically-returning mold ejection device according to claim 1, wherein the returning rod flanges are installed in the flange circular grooves formed in the upper portion of the upper mold connecting plate through 4 third screws evenly distributed along the circumference.

6. The automatically-returning mold ejection device according to claim 1, wherein the device comprises four returning rods distributed along the circumference and one returning rod located at the center of a circle.

7. The automatically-returning mold ejection device according to claim 1, wherein the second screws are M16× 110 inner hexagonal screws, the third screws are M8×20 inner hexagonal screws, and the fourth screws are M8×25 inner hexagonal screws.

8. The automatically-returning mold ejection device according to claim 1, wherein the number of the ejection rod pressing plate limiting columns is 5 to 6, and the ejection rod pressing plate limiting columns are locked on the ejection rod pushing plate through the second screws.

9. The automatically-returning mold ejection device according to claim 1, wherein the positions, corresponding to the returning rods, of the lower portion of the ejection rod pushing plate are provided with key slots, and the key slots are matched with flat keys at the tops of the returning rods to play an anti-rotation role.

10. A casting mold comprising the automatically-returning mold ejection device according to claim 1, wherein the casting mold further comprises a lower mold core, an upper mold core, ejection rods, ejection rod pressing plates, wedges, lateral pull cores, transversely moving guide rails, transversely moving guide plates, long screws, wedge plates and heightening members, wherein the lower mold core is fixed to the mold rack base plate through screws, and the wedges are locked and fixed to the side faces of the lower mold core through screws and arranged on an upper plane of the mold rack base plate; the transversely moving guide plates are fixed to the upper mold core through screws, the lateral pull cores are connected with the transversely moving guide rails through screws, and the transversely moving guide plates and the lateral pull cores are configured to perform transverse reciprocating motions along guide grooves of the transversely moving guide plates; the lateral pull cores are configured to perform upward and downward motions along oblique upper guide strips on the wedges in the drawing process, and accordingly the lateral pull cores are configured to achieve entering and drawing out; the wedge plates are fixed to the wedges through the long screws, the wedge plates are machined and made by an abrasion-proof material, and the oblique planes of the wedge plates are matched with planes of the rear sides of the lateral pull cores; the heightening members are placed on the upper plane of the upper mold core and locked through the screws, so that the upper end faces of the heightening members and the lower plane of the upper mold connecting plate are matched and are locked through the screws.

* * * * *